United States Patent
Kindberg

(10) Patent No.: US 8,170,784 B2
(45) Date of Patent: May 1, 2012

(54) METHOD AND APPARATUS FOR MOVING CONTENT TO MOBILE DEVICES

(75) Inventor: Timothy Kindberg, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 467 days.

(21) Appl. No.: 12/525,220

(22) PCT Filed: Jan. 31, 2008

(86) PCT No.: PCT/US2008/001281
§ 371 (c)(1),
(2), (4) Date: Jul. 30, 2009

(87) PCT Pub. No.: WO2008/094644
PCT Pub. Date: Aug. 7, 2008

(65) Prior Publication Data
US 2010/0106408 A1 Apr. 29, 2010

(30) Foreign Application Priority Data
Jan. 31, 2007 (GB) .................................. 0701775.9

(51) Int. Cl.
*H04Q 7/24* (2006.01)
*G06F 19/00* (2006.01)
(52) U.S. Cl. .......................... 701/208; 701/300; 345/427
(58) Field of Classification Search .................. 701/208, 701/200, 211, 300; 345/427, 632; 715/757
See application file for complete search history.

(56) References Cited

U.S. PATENT DOCUMENTS

| | | | |
|---|---|---|---|
| 5,488,559 A | 1/1996 | Seymour | |
| 5,596,500 A | 1/1997 | Sprague et al. | |
| 5,751,576 A * | 5/1998 | Monson | 700/83 |
| 6,240,360 B1 * | 5/2001 | Phelan | 701/208 |
| 6,505,116 B1 | 1/2003 | Koyama | |
| 2004/0169653 A1 | 9/2004 | Endo et al. | |
| 2006/0276961 A1 | 12/2006 | Kwon | |

FOREIGN PATENT DOCUMENTS

| | | |
|---|---|---|
| GB | 2 431 831 A | 5/2007 |
| WO | WO-98/58332 A1 | 12/1998 |
| WO | WO-01/13656 A1 | 2/2001 |

OTHER PUBLICATIONS

European Search Report for Application No. PCT/US2008/001281, Jun. 19, 2008.
Written Opinion for Application No. PCT/US2008/001821, Jun. 19, 2008.

* cited by examiner

*Primary Examiner* — Tan Q Nguyen

(57) ABSTRACT

A method and apparatus is provided for moving content to a mobile device (2). A data item (34) of a predetermined type is received at a first device (14), the data item (34) including a content URI for fetching content associated with the data item. Upon detecting that the data item (34) is of the predetermined type, the first device (14) generates a symbol (40) representing at least: a local address of a content-retrieval device (14) on a local wireless network, and an explicit or implicit identifier of the content associated with the data item. The symbol (40) is then read using the mobile device (2). The mobile device (2) decodes the symbol and transmits a request, containing the content identifier, to the content-retrieval device (14). On receiving the request, the content-retrieval device (14) uses—the content identifier in the request to obtain that content, and replies to the request with the obtained content.

18 Claims, 3 Drawing Sheets

METHOD AND APPARATUS FOR MOVING CONTENT TO MOBILE DEVICES

The present application is a national stage filing of PCT application number PCT/US2008/001281, having an international filing date of Jan. 31, 2008, which claims priority to patent application serial number GB0701775.9, filed Jan. 31, 2007, both of which are incorporated by reference in their entireties.

FIELD OF THE INVENTION

The present invention relates to methods and apparatus for referencing a map to the coordinate space of a positioning system (such as GPS) to enable the map to be used, for example and without limitation, in the design and operation of a mediascape.

BACKGROUND OF THE INVENTION

Maps are a vital part of location based services; they are used in both the creation and consumption of these services and applications. For example, mediascapes generally use maps in their creation and consumption. Mediascapes are collections of digital media items linked to the physical world through action-triggers. Each action-trigger specifies a condition set of one or more conditions concerning the physical world, and at least one media-item-specific action that is to be triggered upon satisfaction of the condition set. A typical condition would be a location-based condition satisfied upon a user entering a specified geographic zone specified at creation time via a map. The action-triggers are typically specified in a script which is downloaded, along with the related media items to a user-portable device such as a hand-held computer or PDA (Personal Digital Assistant). The user device interprets inputs in accordance with the script to carry out specified media actions on particular ones of the stored media items. For example, a simple script might specify a location-based action-trigger that causes the user device is to play a particular audio file whenever the user enters a particular city square as determined by a positioning system such as GPS.

Obtaining accurately aligned maps of an area for the creation of mediascapes and other location based applications is a major obstacle to the widespread deployment of such applications by community groups and other small and medium organizations. The existing ways of sourcing accurate maps for location based applications all have drawbacks:

Using map imagery and coordinate data from online or printed maps almost always involves copyright issues with licenses generally only being available on very restricted terms. Additionally, such maps are often far from ideal for authoring or experiencing location based applications.

Purchasing mapping data from the original source of the data. This is possible but tends to be prohibitively expensive for most authors and consumers. Again, usage terms are usually very restrictive.

Making maps oneself or using a map supplied without coordinate data and then aligning the map by hand using GPS readings calls for mathematical abilities that are beyond most authors, as well as being time consuming and prone to errors.

SUMMARY OF THE INVENTION

According to one aspect of the present invention, there is provided a method of referencing a map to the coordinate space of a positioning system, the method comprising:

for each of a plurality of real-world positions, associating the location of the real-world position in a coordinate space of the map, with a location in the coordinate space of the positioning system determined by taking at least one positioning-system reading at the real-world position; and using the associated locations to determine a master transform for converting relative location information between said coordinate spaces, said relative location information serving to specify a location relative to the already-known locations of said plurality of real-world positions.

According to another aspect of the present invention, there is provided portable apparatus comprising:

a positioning system for deriving a location in a coordinate space of the positioning system corresponding to a current real-world position of the apparatus;

a user interface arranged to display a map and enable locations in the coordinate space of the map to be selected by/identified to a user;

a memory for storing locations in both said coordinate spaces; and a processing arrangement arranged to associate the location in the coordinate space of the positioning system of a said current position of the apparatus with a corresponding location in the map coordinate space for a plurality of different said current positions, the processing arrangement being further arranged to use the associated locations to determine a master transform for converting relative location information between said coordinate spaces, said relative location information serving to specify a location relative to the already-known locations of said plurality of current positions.

BRIEF DESCRIPTION OF THE DRAWINGS

Embodiments of the invention will now be described, by way of non-limiting example, with reference to the accompanying diagrammatic drawings of embodiments of the invention, in which.

BEST MODE OF CARRYING OUT THE INVENTION

Figure 1:
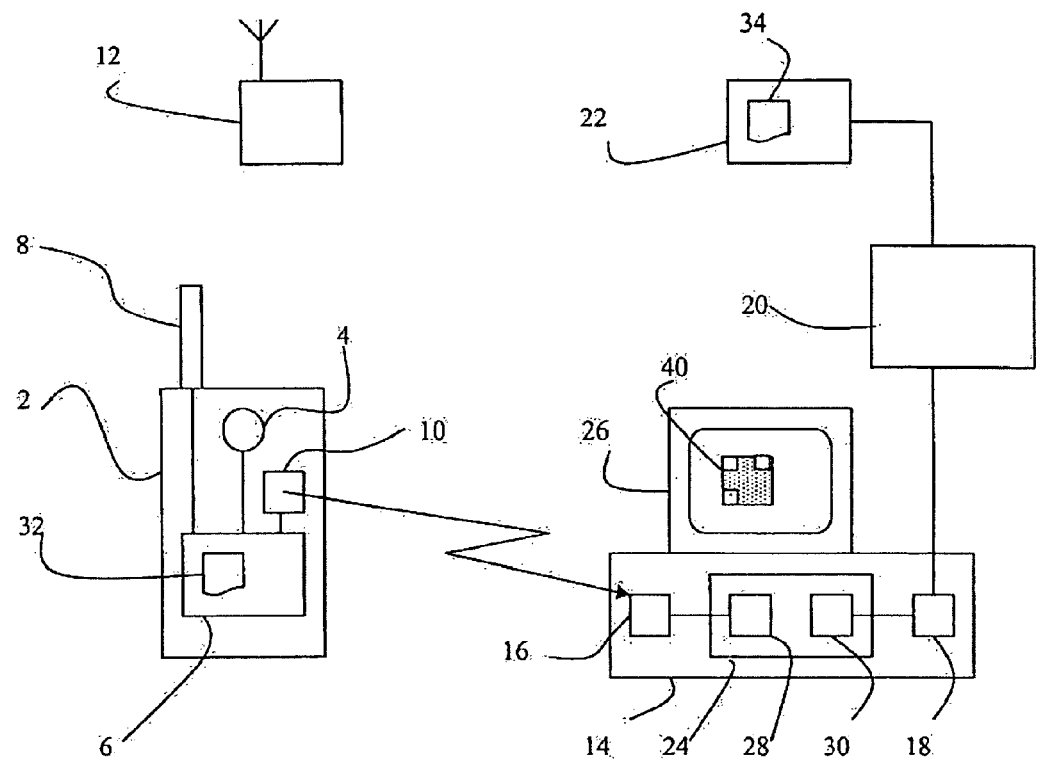
FIG. 1 is a diagram of a GPS-enabled PDA displaying a selected portion of a map in the form of an aerial image of a locality of interest.

FIG. 1 shows an embodiment of apparatus for referencing a map (here shown in the form of an aerial view 16 of a geographic area for which, for example, a mediascape application is to be designed) to the coordinate space of a GPS positioning system (as used herein, the term "positioning system" means a system providing current real-world position in terms of coordinates used by the system, the range of possible coordinates delimiting the coordinate space of the system).

It will be understood that the coordinate system used by the GPS positioning system will generally differ significantly from that used by the map, not only in terms of origin and units employed, but also with respect to orientation and scale. With regard to the map, it is preferred to use an origin and unit measure based on the displayed map (rather than an origin and unit measure otherwise associated with the map) because the purpose of the referencing operation, at least in the present example, is to enable a displayed image of the map to be used in the design and operation of a mediascape. Thus the coordinate space of the map is taken to be defined in terms of image pixels starting. It would be possible to use a different map coordinate space but this would generally involve converting pixel values to such other coordinate space. It will be assumed hereinafter that the map coordinate space uses display pixels to define locations within the space.

For convenience, the coordinate space of the GPS positioning system is referred to as "grid space" while the map coordinate space is referred to as "pixel space"

Further, for convenience, the following description refers to 'aligning' a map to the coordinate space of the positioning system (grid space); it is to be understood that this alignment encompasses not only directional alignment but also scaling (and translation, in the case of the final determination of map reference points, such as map corners, in grid space coordinates).

The FIG. 1 embodiment takes the form of a portable computing apparatus 10 (such as a Hewlett-Packard iPAQ PDA), that comprises:
- a user interface 11 which, for example, is comprises a display and an input device in the form of a sensing arrangement for detecting where the display is touched using a stylus (not shown);
- a memory 13 storing an operating system program (not shown, such as 'pocket PC') and a map aligner program 17, as well as data such as map data 15 (in the present example, this map data takes the form of image data representing the aerial view 16);
- a processor 12 (and associated RAM memory) arranged to run the operating system program and map aligner program 17; and
- a GPS unit 14 providing geographic position readings on a regular basis such as once every second; the GPS unit 14 can alternatively be provided as a stand alone module communicating with the PDA 10 via any suitable wired or wireless link.

To reference the aerial-image map 16 to grid space (that is, the coordinate space of the GPS unit 14), a user causes the apparatus 10 to execute the map aligner program 17. The operations performed by the program 17, under user control, are illustrated by steps 20 to 29 in the FIG. 2 flowchart.

In step 20, a portion of the map 16 is displayed in a window 18A on the display 11; the map can be scrolled left/right, up/down by operating scroll bars of the window 18A using a stylus thereby enabling any desired portion of the map to be viewed. The relative location of the map portion shown displayed in FIG. 1 is indicated by the dashed box superimposed on the full map 16. At the same time as displaying a portion of the map in window 18A, operating instructions are displayed in display area 18B; command buttons, operable by use of a stylus, are also displayed in a display area 18C.

The map alignment process involves the user (together with the apparatus 10) moving to a number of real world positions and for each such position:
- determining the corresponding location in pixel space (that is, the coordinate space of the map) by indicating a spot on the displayed map using a stylus (after having scrolled to the relevant map portion); and
- determining the corresponding location in grid space (the coordinate space of the GPS positioning system) by taking one or more readings using the GPS unit 14. Preferably, this involves taking a set of about 30 readings and then calculating the mean and standard deviation of the set, the average being taken as the location in the coordinate space of the GPS system corresponding to the user's current real-world position.

Figure 2:
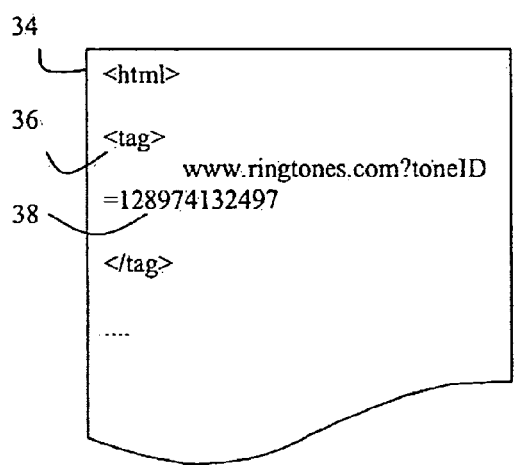
FIG. 2 is a flow diagram illustrating the flow of operations for referencing a map to the coordinate space of a GPS positioning system according to an embodiment of the invention.

This is step 21 of the FIG. 2 flowchart.

In the following, the convention is used that the user's real world position is designated generally by variable x with specific real-world positions being designated X1, X2 etc. Locations in pixel space (the map coordinate space) are designated "$L_P$" whereas locations in grid space (the coordinate space of the GPS positioning system) are designated "$L_G$". For real-world position X1, the corresponding pixel space location is designated $L_P1$ and the corresponding grid space location $L_G1$. As will be described below, the present embodiment involves the use of vectors between locations in the grid space and vectors in the pixel space; these vectors are generally designated $V_G$ and $V_P$ (grid space vectors, pixel space vectors) followed by the numbers associated with the pair of locations concerned—thus a pixel space vector between locations $L_P1$ and $L_P2$ is designated $V_P(1,2)$. Finally, to indicate a vector in pixel/grid space that has been determined by transforming the corresponding vector in grid/pixel space (as opposed to being based on locations already known in the space in which the vector exists), the prime superscript "'" is used; thus $V'_P(1,2)$ indicates a pixel space vector formed by transforming the grid space vector $V_G(1,2)$.

Considering a first iteration of step 21, the user moves to a real-world position X1 and then determines the corresponding grid space location $L_G1$ by using the GPS unit to determine an averaged reading; the corresponding pixel space location $L_P1$ is also captured by the user using a stylus to indicate the location on the displayed map (the indicated location is represented by cross 20 in FIG. 1, such a cross preferably being displayed automatically when a location is indicated on the displayed map using the stylus. If the user is satisfied, the user operates the "Add point" command button to associate and record locations $L_G1$ and $L_P1$.

Of course, the pixel space location can be set in on the displayed map before the corresponding grid space location is captured.

Advantageously, the real-world position chosen for the recording of associated pixel space and grid space locations corresponds to a real-world feature visible on the map. However, this is not essential and the real-world position can be a position estimated by a user as corresponding to a selected map location (such as a map corner location). Alternatively, the real-world position can be chosen first and the corresponding map location then estimated by the user.

Returning now to a consideration of the FIG. 2 flow chart, after an iteration of the location-capture step 21, a check is made as to how many location-capture operations have been carried out (step 22). If less than three location-capture operations have been performed, the location capture step 21 is re-entered. After three location-capture operations have been performed, the check step 22 causes a transform-determination step 23 to be carried out. This step 23 is explained below with reference to FIG. 3.

Figure 3:
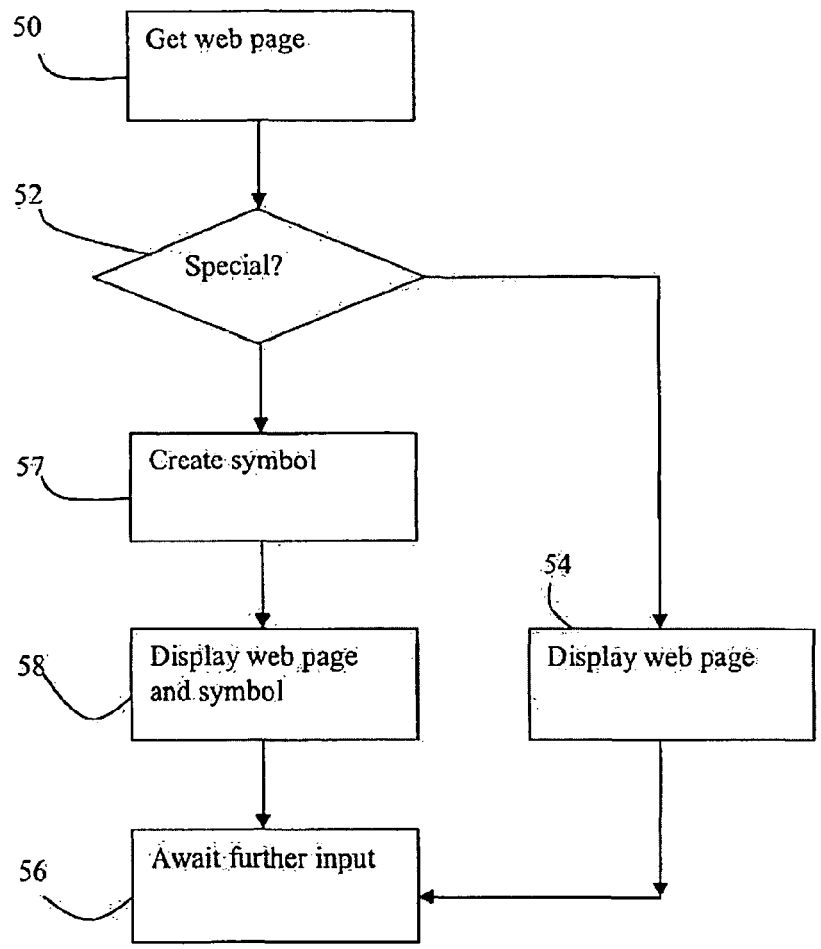
FIG. 3 is a diagram illustrating an initial determination of a master transform for converting relative location information between the coordinate space of the GPS positioning system and the map coordinate space.

The upper part of FIG. 3 shows the three real-world positions X1, X2, X3 at which the location-capture step 21 has been effected. These location-capture operations resulted in the recording of three pairs of associated locations, each pair comprising a location in grid space and the corresponding location in pixel space, namely ($L_G1$, $L_P1$), ($L_G2$, $L_P2$) and ($L_G3$, $L_P3$). In each space, the vectors between each pair of locations is then determined (but only in one direction) after which for each pair of corresponding vectors in grid space and in pixel space (for example vector pair $V_G(2,3)$ and $V_P(2,3)$—see lower part of FIG. 3), a scaling and orientation transform is determined for converting the vector from grid space to pixel space. In FIG. 3, the transforms are designated:

$T_{GP\{V(1,2)\}}$ for the vector between locations 1 and 2;
$T_{GP\{V(1,3)\}}$ for the vector between locations 1 and 3; and
$T_{GP\{V(2,3)\}}$ for the vector between locations 2 and 3.

The initial suffix "GP" indicates the operative direction of the transform, that is, from grid to pixel space.

From these individual vector transforms $T_{GP\{V(1,2)\}}$, $T_{GP\{V(1,3)\}}$, and $T_{GP\{V(2,3)\}}$, a master transform $MT_{GP}$ is derived for transforming vectors from grid space to pixel space. The master transform $MT_{GP}$ comprises scaling and rotation factors with each factor preferably being the median of the corresponding factors of the individual transforms.

Following step 23, step 24 is carried out to check how many real-world positions have been processed If the count is less than five, processing loops back via step 27 (to be described below) for another iteration of step 21. However, if the count is five or above, step 25A is carried out to determine whether any of the grid-space readings provided by the GPS unit 14 is significantly inconsistent with the other captured data, such an inconsistent reading being referred to herein as an "outlier". The process used to check for outliers will now be described with reference to FIG. 4. This process involves the use of the inverse of the master transform $MT_{GP}$, that is a transform for transforming a pixel-space vector to a grid-space vector; this inverse transform is herein designated $MT_{PG}$ (the suffix indicating the transform direction) and is readily determined from the master transform $MT_{GP}$ as will be apparent to persons skilled in the art.

Figure 4:
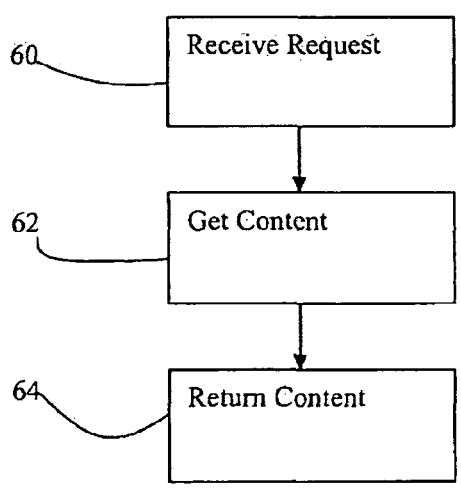
FIG. 4 is a diagram illustrating the determination of potentially false positioning system readings.

The following description, given with reference to FIG. 4, of the determination of outliers in step 25A, is for an example case where grid and map locations have been captured for four real world positions X1, X2, X3 and X4.

Figure 5:
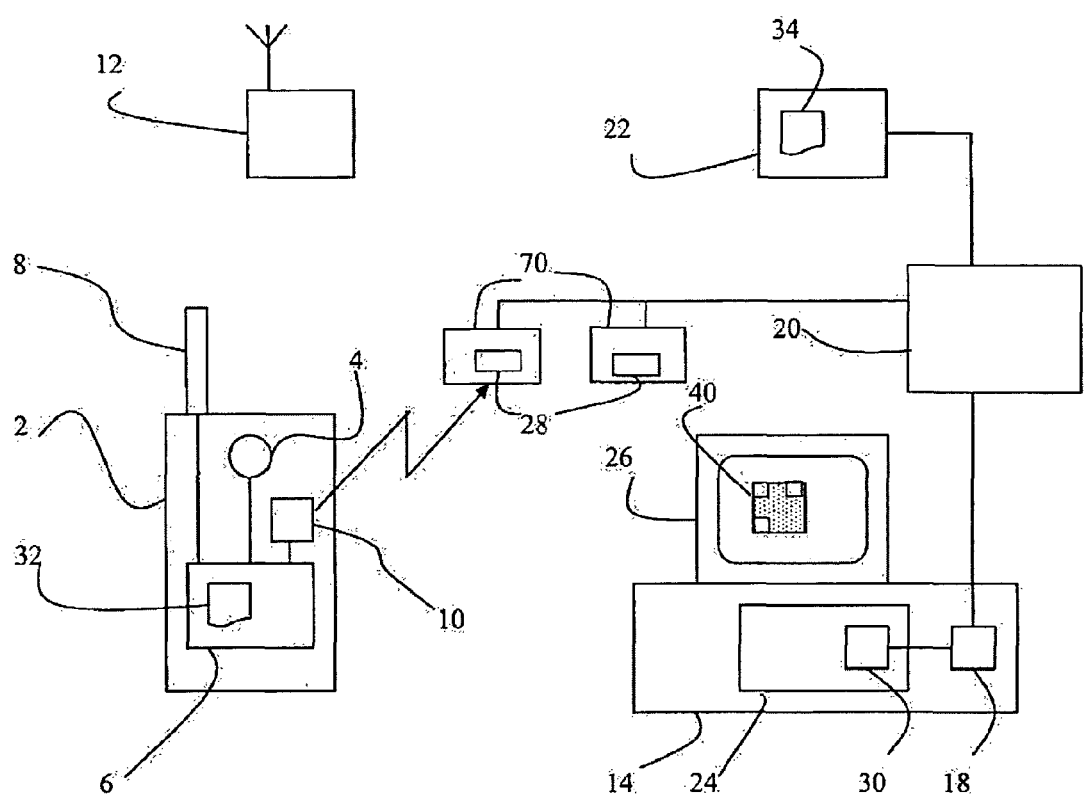
FIG. 5 is a diagram illustrating the determination of location error range for a current location.

The upper part of FIG. 4 depicts the apparatus 10 showing on the displayed map portion 35, three dashed crosses 31, 32, 33 that respectively indicate three already-captured map locations corresponding to real world positions X1, X2, X3. The displayed map portion 35 also shows a further dashed cross 37 indicating a further already-captured map location $L_P4$ corresponding to real-world position X4 and grid-space location $L_G4$ (provided by GPS unit 14). The lower part of FIG. 5 shows both the captured grid-space locations $L_G1$, $L_G2$, $L_G3$, $L_G4$ and pixel-space locations $L_P1$, $L_P2$, $L_P3$, $L_P4$ corresponding to X1, X2, X3, X4; also shown are the pixel-space vectors $V_P(1,3)$, $V_P(2,3)$, $V_P(4,3)$ from locations $L_P1$, $L_P2$, $L_P4$ to the location $L_G3$.

In step 25A, each recorded grid-space location is checked in turn to see if it is an outlier. For illustrative purposes, this outlier check will now be described in respect of location $L_G3$. The check commences by determining the pixel-space vectors $V_P(1,3)$, $V_P(2,3)$, $V_P(4,3)$ and transforming them into respective corresponding grid-space vectors $V'_G(1,3)$, $V'_G(2,3)$, $V'_G(4,3)$ by applying the inverse master transform $MT_{PG}$ to the pixel-space vectors. Each of the transformed vectors $V'_G(1,3)$, $V'_G(2,3)$, $V'_G(4,3)$ then has its start end anchored to the corresponding already-known grid-space location $L_G1$, $L_G2$, $L_G4$; the free end points 50 of the transformed vectors $V_G(1,3)$, $V_G(2,3)$, $V'_G(4,3)$ would now ideally coincide with the already-known grid-space $L_G3$ location. In practice, due to inaccuracies in the readings provided by the GPS unit 14 as well as map alignment errors, the end points 50 of the grid-space vectors $V'_P(1,x)$, $V'_P(2,x)$, $V'_P(3,x)$ will not normally coincide with $L_G3$ but will be scattered nearby. The median and standard distribution of the set of end point 50 is calculated and the difference between this calculated average location and the location $L_P3$ captured by the unit 14 is determined as a percentage of the standard deviation of the calculated endpoint and used to determine whether the captured location $L_P3$ fits in with the current alignment; if the percentage is greater than a predetermined threshold (for example, 200%), the captured grid-space location $L_P3$ and the corresponding pixel space location $L_G3$ are discarded.

It will be appreciated that carrying out an outlier check on a captured grid-space location will generally involve many more vectors than that used in the foregoing description (generally, but not necessarily, all already-known locations other than the one being checked will be used as a vector starting point).

After the determination of outliers in step 25A, the user is given the opportunity to elect for removal of the worst outlier found (step 25B) and if an outlier is chosen for removal, this is effected in step 25C.

Following removal of an outlier in step 25C, step 124 is carried out to check whether the count of real-world positions processed (excluding any such positions associated with discarded outliers) is still five or greater. If the count is less than five, processing loops back via step 25 (to be described below) for another iteration of step 21. However if the count is five or above, or if the user elected not to remove an outlier is step 25 B, the user is given the opportunity to end the capture of location data (step 26). If this is declined processing loops back via step 25 for another iteration of step 21.

As the use moves to a new real-world position to repeat step 21, the GPS unit 14 provides a succession of grid-space location readings and each of these is used to provide an indication of the current accuracy of map alignment at the location concerned (step 27). How this is achieved is described below with reference to FIG. 5.

The upper part of FIG. 5 depicts the apparatus 10 showing on the displayed map portion 35, three dashed crosses 31, 32, 33 that respectively indicate the already-captured map locations corresponding to real world positions X1, X2, X3.

The lower part of FIG. 5 shows both the grid-space locations $L_G1$, $L_G2$, $L_G3$ corresponding to X1, X2, X3, and the pixel-space locations $L_P1$, $L_P2$, $L_P3$ corresponding to X1, X2, X3. Also shown is a current GPS unit reading (i.e. grid-space location) $L_Gx$, corresponding to the user's current real-world position x, and the grid-space vectors $V_G(1,x)$, $V_G(2,x)$, $V_G(3,x)$ from the already-known locations $L_G1$, $L_G2$, $L_G3$ to the location $L_Gx$.

In step 27, the grid-space vectors $V_G(1,x)$, $V_G(2,x)$, $V_G(3,x)$ are determined, after which these vectors are transformed into respective corresponding pixel-space vectors $V'_P(1,x)$, $V'_P(2,x)$, $V'_P(3,x)$ by applying the master transform $MT_P$ to the grid-space vectors (as already noted, the prime """ on each of these vector indicates that they have been formed by transformation). Each of the transformed vectors $V'_P(1,x)$, $V'_P(2,x)$, $V'_P(3,x)$ then has its start end anchored to the corresponding already-known pixel-space location $L_P1$, $L_P2$, $L_P3$; the free end points 45 of the transformed vectors $V'_P(1,x)$, $V'_P(2,x)$, $V'_P(3,x)$ would now ideally coincide and thereby indicate the precise pixel-space location $L_Px$ corresponding to the grid-space location $L_Gx$ and thus to the user's current real-world location x. In practice, due to map alignment errors, the end points 45 of the pixel space vectors $V'_P(1,x)$, $V'_P(2,x)$, $V'_P(3,x)$ will not coincide but will lie within a circle (more generally an ellipse) of error. By determining the median and standard deviation of the set of end points 45 and displaying the result on the displayed map portion 35 as an error ellipse 36, the user is given a visual indication of the size of the map alignment error at the user's current location thereby helping the user determine the geographic areas where it would be most profitable to capture more pairs of associated locations by repeating step 21 in order to minimize alignment errors.

Referring back to FIG. 2, it will be seen that after the first three iterations of the location-capture step 21, each subsequent iteration results in the re-determination of the master transform $MT_{GP}$ (step 23); each re-determination is preferably based on determining individual transforms for every possible vector between the captured locations in a space—thus each re-determination will newly include a progressively increasing number of individual transforms.

In due course, the user will decide that enough pairs of associated locations have been captured and, at step 26, causes processing to proceed to step 28.

In step 28, the grid-space location corresponding to each corner of the map is calculated. This is done for each map corner by applying the inverse of the master transform to the pixel-space vectors from each recorded pixel-space location to the map corner; the transformed vectors then being applied to the corresponding recorded grid-space locations to give the grid-space location of the map corner (the pixel space location of the map corner is thus effectively transformed not only by rotation and scaling, but also by translation). The grid-space map corner locations are then output (step 29) for use. For example, the map corner locations in grid-space may be output to a mediascape design system for use in converting trigger location data to grid-space locations (step 30) for comparison with GPS readings provided during operational use of the mediascape. It will be appreciated that step 30 is not part of the map aligner program 17 and neither the mediascape design system nor any other system for using the data output in step 29 forms a part of the present invention.

The reason to output the grid space locations corresponding to the map corners is that this information makes it very easy to convert a map location to a grid-space location.

It will be appreciated that although in the above example, the map being aligned took the form of an aerial image, the map could have taken a different form such as a map drawn on a computer or even a hand-drawn map or other paper map scanned into digital form and loaded into the device 10. Additionally, instead of the GPS unit 14 any other suitable form of positioning system (whether satellite-based or terrestrial) can be used; the coverage of the positioning system can, of course, be considerably less than the global coverage provided by GPS and need only extend to cover the geographic area of interest.

The input device of the apparatus by which a user selects a map location can also take a different form to that mentioned above; for example, any device for positioning a screen cursor and indicating when it is at a desired position would be suitable.

It will be appreciated that providing an alignment error indication (step 27) is preferred but can be omitted; the same is also true of the determination and removal of outliers (step 24). Furthermore, although the preferred output of the map aligner program 17 is in the form of the grid-space locations of the map corners, the output can take any form suitable for passing the information needed to convert between grid space and the map space. Thus, map locations other than the map corners can be used as reference points; it would, of course, be possible simply to output the last determined value of the master transform $MT_{GP}$ or its inverse $MT_{PG}$.

It will also be appreciated that the above-described method is based on transforming relative location information (here in the form of the scaling and orientation of vectors) which is then used in conjunction with already-known locations in the coordinate space into which the relative location information has been transformed. In other words, absolute location information is not transformed and accordingly the method can be viewed as concerned with consistency between the captured locations rather than consistency with some absolute location reference. Other forms of relative location information can be used as an alternative to vectors using techniques such as RANSAC (an abbreviation for "RANdom SAmple Consensus) and a least squares estimator, both of which are from the field of image processing Use of above-described method and apparatus enables a user to employ commodity equipment to take any pictorial representation of an area, from a photograph to a sketch map, and accurately align the map image to the coordinate space of a positioning system. If the map is not accurate or distorted in some way then this can also be expressed to the user which allows the user to discard the map and source an alternative.

The invention claimed is:

1. A method of referencing a map to the coordinate space of a positioning system, the method comprising:
   for each of a plurality of real-world positions, associating the location of the real-world position in a coordinate space of the map, with a location in the coordinate space of the positioning system determined by taking at least one positioning-system reading at the real-world position; and
   using the associated locations to determine a master transform for converting relative location information between said coordinate spaces, said relative location information serving to specify a location relative to the already-known locations of said plurality of real-world positions.

2. A method according to claim 1, wherein at least one said real-world position corresponds to a real-world feature marked on the map.

3. A method according to claim 1, wherein at least one said real-world position is a position estimated by a human as corresponding to a selected map location.

4. A method according to claim 3, wherein selected map location is a map corner location.

5. A method according to claim 1, wherein for at least one said real-world position the corresponding map location is estimated by a human.

6. A method according to claim 1, wherein the location of a said real-world position in the coordinate space of the positioning system is determined as an average of a plurality of positioning-system readings taken at the real-world position.

7. A method according to claim 6, wherein the standard deviation of the readings used to determine said mean is determined and compared to a predetermined threshold value, the mean being discarded where the standard deviation of the readings is greater man the threshold value.

8. A method according to claim 1, wherein further real-world positions are progressively added to said plurality and their locations in said coordinate spaces associated, the master transform being re-determined for each n further points added where n is an integer $\geq 1$.

9. A method according to claim 1, wherein said master transform is determined by a process comprising:
   determining first vectors between locations of said real-world positions in the coordinate space of the positioning system;

determining second vectors between locations of said real-world positions in the coordinate space of the map;

determining, for each first vector, an individual angle and scaling transform for converting the vector to a corresponding one of the second vectors; and deriving said master transform as an average of said individual transforms;

the master transform being usable to convert, between said coordinate spaces, relative location information having the form of said vectors.

10. A method according to claim 9, further comprising:

determining the location, in the coordinate space of the positioning system, of a further real-world position by taking at least one positioning-system reading at the real-world position;

determining, in the coordinate space of the positioning system, further first vectors between the location of said further real-world position and the locations of at least some of said plurality of real-world positions;

using said master transform to convert the further first vectors to corresponding further second vectors;

combining, in the coordinate space of the map, the second vectors and the locations of said at least some of said plurality of real-world positions whereby to derive a set of estimated locations for said further real-world position in the coordinate space of the map; and processing said set of estimated locations to derive a mean and standard deviation for said further real-world position in the coordinate space of the map.

11. A method according to claim 10, further comprising determining a standard deviation of the set of estimated locations; and providing a visual indication of said mean location and standard deviation in the form of an ellipse displayed on an image of the map.

12. A method according to claim 9, further comprising:

determining, in the coordinate space of the map, a set of vectors between a specific map location and the locations of said real-world positions;

using said master transform to convert said set of vectors to a corresponding set of transformed vectors;

combining, in the coordinate space of the positioning system, the set of transformed vectors and the locations of said real-world positions whereby to derive a set of estimated locations for said specific map location in the coordinate space of the positioning system; and processing said set of estimated locations to derive a mean value.

13. A method according to claim 12, wherein said specific map location is the location of one said real-world positions, the method further comprising determining a standard deviation of the set of estimated locations;

determining a difference value, as a proportion of the standard deviation of said set of estimated locations, between the location of said one real-world position as determined using the positioning system and the mean derived using said set of estimated locations; and rejecting the locations of said one real-world position in said coordinate spaces where said difference is greater than a predetermined threshold.

14. A method according to claim 12, wherein said specific map location is a map boundary location.

15. A method according to claim 14, wherein said map boundary location is a map corner.

16. A method according to claim 1, wherein said positioning system is a GPS system.

17. A method according to claim 1, wherein the map is an image displayed on a display screen, the coordinate space of the map being the pixel space of the image.

18. Portable apparatus comprising:

a positioning system for deriving a location in a coordinate space of the positioning system corresponding to a current real-world position of the apparatus;

a user interface arranged to display a map and enable locations in the coordinate space of the map to be selected by/identified to a user;

a memory for storing locations in both said coordinate spaces; and a processing arrangement arranged to associate the location in the coordinate space of the positioning system of a said current position of the apparatus with a corresponding location in the map coordinate space for a plurality of different said current positions, the processing arrangement being further arranged to use the associated locations to determine a master transform for converting relative location information between said coordinate spaces, said relative location information serving to specify a location relative to the already-known locations of said plurality of current positions.

* * * * *

UNITED STATES PATENT AND TRADEMARK OFFICE
CERTIFICATE OF CORRECTION

PATENT NO. : 8,170,784 B2  
APPLICATION NO. : 12/525220  
DATED : May 1, 2012  
INVENTOR(S) : Timothy Kindberg Page 1 of 1

It is certified that error appears in the above-identified patent and that said Letters Patent is hereby corrected as shown below:

In column 8, line 57, in Claim 7, delete "man" and insert -- than --, therefor.

Signed and Sealed this  
Eleventh Day of December, 2012

David J. Kappos  
*Director of the United States Patent and Trademark Office*